Figure 1:
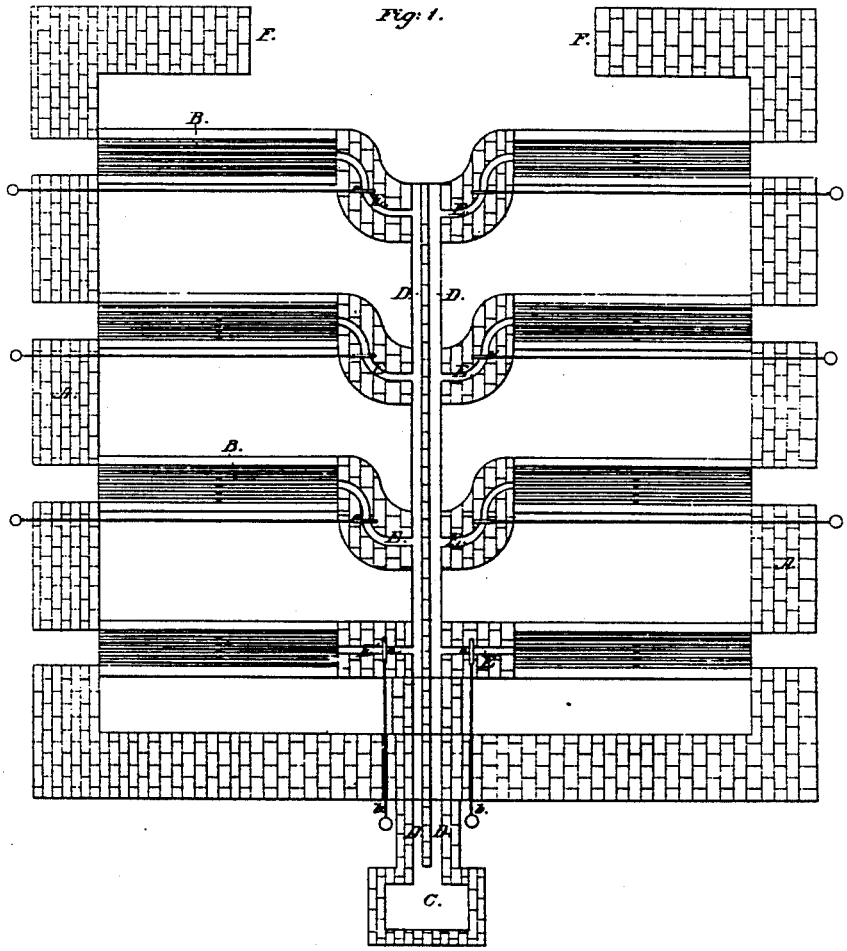
Figure 2:
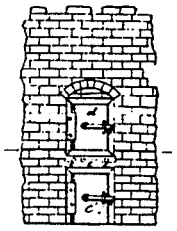

2 Sheets—Sheet 2.

J. W. ANDREWS.

BRICK KILN.

~~A.~~ I. No. 78. Patented Mar. 21, 1843.

THE WORKS PETERS CO. PHOTO-LITHO. WASHINGTON, D. C.